(No Model.)

L. DURAND.
REVOLVING MARINE BATTERY.

No. 400,836. Patented Apr. 2, 1889.

UNITED STATES PATENT OFFICE.

LOCKWOOD DURAND, OF HUNTINGTON, CONNECTICUT.

REVOLVING MARINE BATTERY.

SPECIFICATION forming part of Letters Patent No. 400,836, dated April 2, 1889.

Application filed October 1, 1888. Serial No. 286,879. (No model.)

*To all whom it may concern:*

Be it known that I, LOCKWOOD DURAND, of Huntington, in the county of New Haven and State of Connecticut, have invented a new Improvement in Revolving Marine Batteries; and I do hereby declare the following, when taken in connection with accompanying drawings and the letters of reference marked thereon, to be a full, clear, and exact description of the same, and which said drawings constitute part of this specification, and represent, in—

Figure 1:
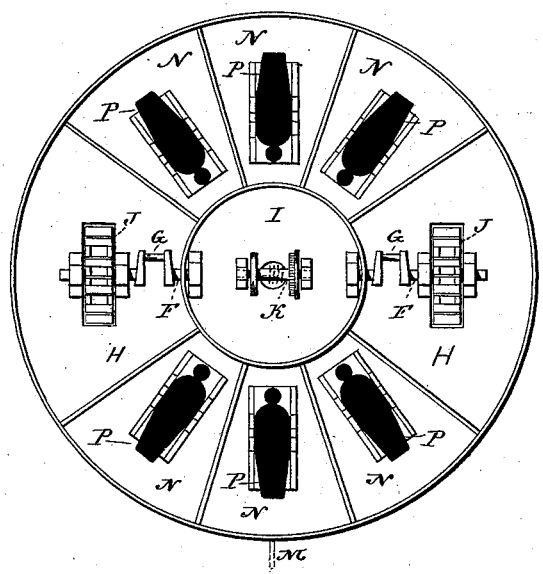
Figure 2:
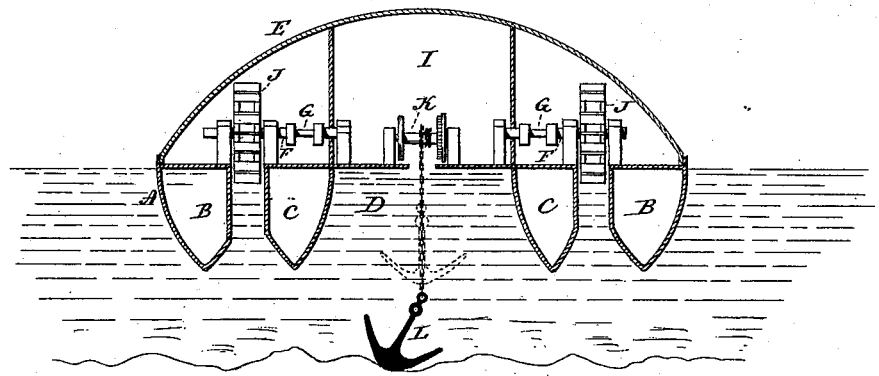
Figure 3:
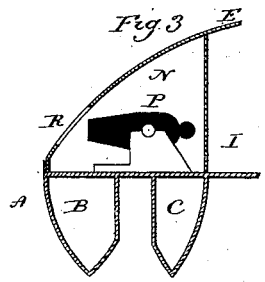

Figure 1, a plan view, the dome removed to show the interior; Fig. 2, a vertical central section showing the propelling and anchorage devices; Fig. 3, a vertical section through one of the gun-compartments.

This invention relates to the construction of a battery for marine purposes, offensive or defensive, and has for its object to construct a battery which may be transferred from place to place and yet be rotative as a whole around a fixed center and so that the guns may be pointed in any direction radiating from the battery; and the invention consists in the construction as hereinafter described, and particularly recited in the claim.

A represents the hull, which is in the form of two concentric rings, B C, connected so as to form but one structure, and so as to leave a central space, D, within the ring-shaped hull. The deck, which makes the platform for the arrangement of the guns, is inclosed by a house, E, of any desirable shape, but preferably of dome shape, as seen in Fig. 2. Diametrically on the deck propelling-shafts F F are arranged, one at each side of the center, and provided with cranks G or other means for applying power thereto—say, steam-engines. One may be arranged each side—say, in the compartment H—and so that each shaft will be driven by its own independent engine.

In the compartments on opposite sides of the center propelling-wheels J are applied to each shaft, which work through openings into the water below, so that the wheels being rotated they will impart corresponding movement to the vessel, one wheel being rotated in one direction, the other in the opposite direction, and the two wheels being arranged one each side the center will impart a rotative movement to the vessel, the axis of which will be the center of the ring-shaped hull.

At the center a windlass, K, is arranged, from which an anchor, L, is suspended, and so that when anchored the vessel is held in position as upon a fixed center, and so that the rotation of the vessel will be around that fixed center. If, however, it is desired to propel the vessel so as to change it from one point to another, the wheels will be driven in the same direction, and the vessel may be guided by a rudder arranged, say, as seen at M in broken lines, Fig. 1.

I do not illustrate the engines or power which is intended to drive the propelling-wheels, as such power is too well known to require illustration. The propelling-wheels and the power which drives them may be any of the known propelling-wheels adapted for the purpose.

The two wheels may be connected so as to work together, if desired. When the vessel is being propelled, the anchor is simply raised and held suspended, as indicated in broken lines, Fig. 2, so as not to interfere with the propulsion of the vessel.

The house portion of the vessel is divided into compartments N, radiating from the center, and in these compartments guns P are arranged, the guns being of common construction and arrangement, so as to be manipulated in the usual manner.

The guns stand in a position radiating from the center, and through the house openings R (see Fig. 3) are formed, through which the guns may be discharged, which openings, when not in use, may be closed in the usual manner. Under this construction the battery may be transferred from place to place, and yet when anchored present only a circular or spherical surface, and may be rotated to present the guns in any desired direction, and when in use this rotation may be continuous, so that the guns may be successively directed to the same point.

The shape of the vessel makes it less liable to injury than the common construction of this class of defenses, and it is practically a movable fort.

The circular-shaped hull affords ample space for the boilers, and the engines and propelling apparatus may be placed below, if desired. The hull also affords ample space for accommodations and storage, and the circular shape is of the strongest possible character to resist forces from the outside.

It will be understood that the vessel is to be constructed from iron or steel, and that the several compartments communicate with each other and with the center.

The battery may be anchored off exposed points and serve as a fort for the protection of the adjacent land, its rotative capacity giving to it great advantages over a stationary fort, and it may be readily transferred from place to place should occasion require, so that it makes practically a movable fort.

I am aware that batteries of circular shape and adapted to be sustained by a connection from the center so as to rotate and also so as to be propelled are not new, and therefore I do not claim, broadly, such a construction of battery, the essential feature of my invention being the construction of the hull in the form of two concentric rings, leaving a water-space between them.

I claim—

The herein-described circular battery, consisting of two concentric ring-shaped hulls, B C, connected, but so as to leave a space between the said two rings, combined with a central anchor, and mechanism, substantially such as described, at the center for raising and lowering said anchor, with propelling-wheels arranged in the space between the said rings, substantially as described.

LOCKWOOD DURAND.

Witnesses:
JOHN E. EARLE,
FRED C. EARLE.